March 10, 1970  W. A. SMITH  3,499,606
INVERT EMULSION SPRAY APPARATUS AND METHOD
Filed June 20, 1967

WARD ALAN SMITH
INVENTOR.

BY John W. Whitson

AGENT

United States Patent Office 3,499,606
Patented Mar. 10, 1970

3,499,606
INVERT EMULSION SPRAY APPARATUS
AND METHOD
Ward Alan Smith, Louisiana, Mo., assignor to Hercules
Incorporated, Wilmington, Del., a corporation of
Delaware
Filed June 20, 1967, Ser. No. 647,416
Int. Cl. B05b; A62c 13/64, 13/26
U.S. Cl. 239—304                                 4 Claims

ABSTRACT OF THE DISCLOSURE

An invert emulsion spray is formed by initially mixing together an oil phase component and a water phase component as a thin fluid premix, one of said components containing emulsifier, mixing the premix under pressure with invert emulsion of the same composition as the premix in a state of rotary agitation with induced flow opposed to the flow of the inflowing premix until increased amount of emulsion is formed, the pressure on the premix being greater than that of the opposing flow of emulsion, passing the increased amount of emulsion to a spray nozzle and discharging the invert emulsion from the nozzle as a spray. Apparatus for producing the emulsion comprises a pumping means to provide a forward pressure for the premix and pumping mixer connected in opposition to said pumping means to produce a back pressure, said back pressure being less than said forward pressure and means for withdrawing emulsion from said pumping mixer.

---

Figure 1:
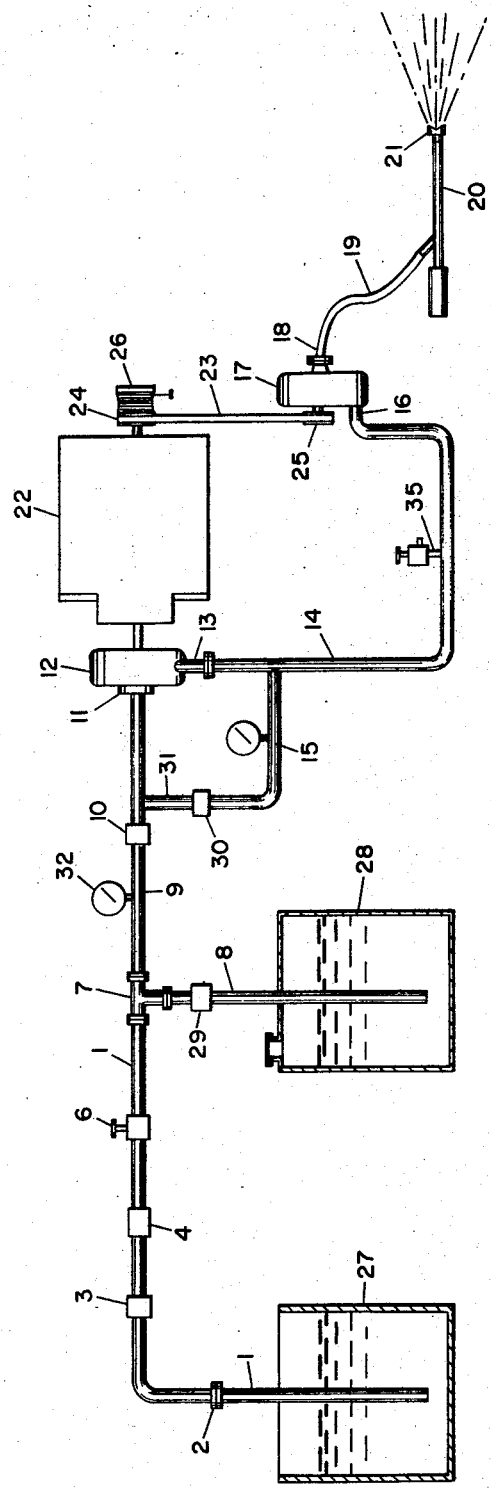
Figure 3:
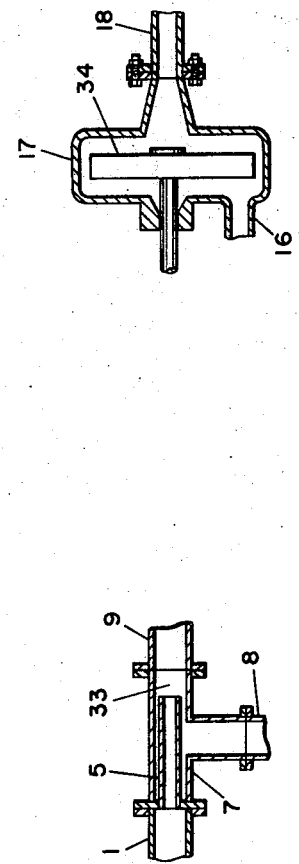
Figure 2:
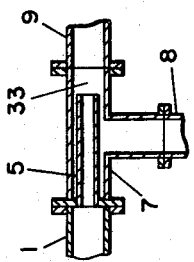

This invention relates to the production of invert emulsion sprays and to apparatus therefor.

Invert emulsion (water-in-oil) sprays containing pesticides have the advantage over oil-in-water emulsion sprays in that they are low-drift in character and are particularly useful in field application. Invert emulsions are difficult to pump to the spray nozzle because of their thick, mayonnaise-like character. In U.S. 3,197,299 and U.S. 3,284,009 to Stull and Morrow, the emulsion is produced in a mixing nozzle by bringing together an aqueous phase component and an oil phase component, in one of which components an emulsifier is preset to produce the invert emulsion. The nozzle brings about flash formation of a thick mayonnaise-like emulsion in the mixing chamber of the mixing nozzle, and the emulsion is converted into a spray on emersion from the spray orifice of the nozzle. Since the residence time in the mixing chamber varies with the rate of spraying, there may be a variability in the thickness of the emulsion unless this is corrected by using an excess of emulsifier to cover a range of rates.

In application Ser. No. 564,861, filed July 13, 1966, and now abandoned, it has been shown that an invert emulsion can be pumped to spray nozzles when the emulsion is produced in a mixer pump, and the components are introduced into the mixer pump prior to being emulsified to the invert form, and the rate of flow is determined by the rate of output of the mixer pump.

It is an object of the present invention to produce an invert emulsion spray with high rate of output.

It is a further object to produce invert emulsions of high thickness over a range of rates of output.

It is a still further object to produce invert emulsion sprays of high thickness with a low emulsifier requirement.

These objects are accomplished by commingling a water phase component and an oil phase component in a water-to-oil ratio in the range of 1:1 to about 24:1 to form a thin fluid premix, at least one of said components containing an effective amount of pesticide, and at least one of said components containing an emulsifier capable of forming a water-in-oil emulsion from said components when subjected to vigorous agitation, subjecting said premix to an elevated pressure, forcing said premix to flow into a mixing chamber containing invert emulsion of the same composition as said premix, said emulsion being in a state of rotary agitation with an induced flow opposed to the flow of said inflowing premix and with pressure opposed to but less than the pressure of said inflowing premix, mixing said premix with said emulsion to form an increased amount of emulsion, passing said increased amount of emulsion, passing said increased amount of invert emulsion to a spray-forming nozzle, and discharging said emulsion therefrom into the atmosphere in the form of a spray.

Using the apparatus of this invention, the invert emulsion spray is produced by introducing separately an oil phase component and a water phase component into a common conduit, in which conduit a thin fluid premix forms, passing said premix under pressure into a mixing vessel having walls defining a mixing chamber wherein there is a rotary impeller, the rotation of which produces a flow of fluid opposed in direction and pressure to the flow of premix passing into the mixing chamber and thereby forming an invert emulsion from said premix, the pressure of said opposing flow being less than the pressure of the premixed oil phase and water phase components entering the mixing vessel, conducting the emulsion produced in the mixing vessel through a conduit to at least one spray-forming nozzle, and out of said nozzle into the atmosphere as an invert emulsion spray, the pressure of the premix of the oil phase and the water phase components being sufficiently great to overcome the opposing pressure of the mixer, the resistance of the conduits and nozzles, and the pressure of the atmosphere.

The oil and water phase components used in the process are used in the ratio desired in the invert emulsion spray produced, and at least one of the components contains the emulsifier in the amount required to produce an invert emulsion. The oil phase usually contains the emulsifier as well as an agricultural pesticide for which the emulsions produced are commonly used as a carrier. The water phase component is usually pure water, but normally available water is suitable. Likewise, salt-containing water is suitable, and the water may also be a carrier for a water-soluble or water-dispersable pesticide as well as emulsifier.

When the water phase component is available water, as is commonly the case when the emulsion spray is produced and directed from a boat on a body of water, the water is usually pumped directly from the body of water into the water phase component conduit. The oil phase component is maintained in a reservoir, and is pumped or forced by pressure from the reservoir into the oil phase component conduit.

The ratio of oil phase component to water phase component is regulated by metering valves or manually operated valves in the fluid lines ahead of the mixer.

The invert emulsion is forced by the pressure on the premix entering the mixer out of the mixer to the nozzles where a spray is formed from the invert emulsion as it enters the atmosphere. The pressure on the premix is thus sufficiently high to overcome the back pressure of the mixer as well as the resistance of the conduits and spray nozzle.

The invert emulsion spray apparatus of this invention is particularly useful in application of herbicides from a boat for control of growth of water plants which grow in and along the shores of canals, lakes and ponds. Some of the advantages thereof are:

(1) The water needed for the emulsion is drawn directly from the body of water supporting the boat, and it may be used without conditioning, whether it is fresh, brackish, or salt water; and it need only be strained to be free of solids.

(2) The temperature of the water does not have to be regulated.

(3) The water-to-oil ratio in the invert emulsion sprays produced is variable and maintainable over a wide range up to about 24:1 with great economy of emulsifier.

(4) The oil phase component composition is not critical, and available kerosene or diesel fuel oil may be used as a diluent in the field.

(5) A high rate of production of invert emulsion spray from much thicker emulsions than produced heretofore in the field permits much greater spraying distances and less drift.

A detailed description of the apparatus with reference to the accompanying drawing follows.

FIGURE 1 represents one embodiment of a combination of apparatus for the production of an invert emulsion spray.

FIGURE 2 shows an enlarged partial cross sectional view of the junction of two conduits to form a common conduit with premix chamber therein, as shown in FIGURE 1.

FIGURE 3 shows the mixer of FIGURE 1 in cross-sectional view.

With reference now to FIGURE 1, the combination of apparatus is seen to comprise a water phase conduit 1, for conducting the water phase through a filter screen 2, a check valve 3, a metering valve 4, and a priming valve 6, to cross junction 7, where oil phase conduit 8 joins to form a common conduit 9, with a premix chamber 33 therein. In common conduit 9, there is a check valve 10; and common conduit 9 leads to the intake 11 of pump 12, out through outlet 13, through premix conduit 14, into the inlet 16 of mixer 17, out the outlet 18 of mixer 17, through emulsion conduit 19, through spray gun 20, and out the spray nozzle 21 of spray gun 20. An engine 22 is used to drive pump 12 and mixer 17, pump 12 being direct drive, and mixer 17 being belt driven by belt 23 and pulleys 24 and 25. The engine 22 is suitably a small gasoline engine with rope starter 26. The pump 12 is suitably provided with a bypass conduit 31 provided with a pop-off valve 30 and a pressure gauge 15.

Between pump 12 and mixer 17 in conduit 14, it is desirable to have an air bleed valve 35 to bleed air out of the system in order to obtain suitable start-up priming.

While the source of water for feeding conduit 1 may be any large open container 27 or a large body of water, the source of the oil phase component for feeding conduit 8 is a container 28 which is portable with the apparatus, and is suitably a small refillable tank.

The ratio of oil to water in the emulsions is controlled by metering valve 4 for the water phase, and a corresponding metering valve 29 for the oil phase. The oil and water phases are drawn into the cross junction 7 where they intermingle and form a thin fluid premix. The suction is measured by gauge 32. The premix is drawn into pump 12 where the premix is placed under sufficient pressure to force the premix into mixer 17 against the opposing force of the rotor therein and through the emulsion conduit 19 and spray gun 20 and out spray nozzle 21 as an invert emulsion spray.

Referring now to FIGURE 2, the cross junction 7 is seen to provide a junction of conduits 1 and 8 wherein an extension 5 of conduit 1 suitably extends into the inside space defining a premix chamber 33 where the water phase entering by way of conduit 1 commingles with the oil phase entering by way of conduit 8. Alternatively, the extension 5 of conduit 1 into the chamber 33 of the junction may be omitted. The junction is shown as a T-junction, but a Y-junction without an extension is also useful.

Referring now to FIGURE 3, the mixer rotor 34 is seen to provide, in conjunction with its housing with inlet 16 and outlet 18, a unit resembling a centrifugal pump with inlet and outlet reversed such that the flow created by the rotary impeller is counter to the flow created by pump 12 in the process of this invention. The mixer is suitably a centrifugal pump connected in reverse using its outlet for an inlet in the process of this invention, or it may be any other rotary mixer which provides flow counter to flow at the inlet thereof. A fan blade rotary mixer in a housing having an inlet and an outlet equivalent to each other exemplifies an alternative mixer, in which mixer the flow is dependent of the direction of rotation of the fan blade impeller.

To operate the apparatus of this invention, conduit 1 is placed in the water reservoir 27, and reservoir 28, from which conduit 8 is fed, is supplied with oil phase component containing essentially emulsifiable concentrate of a pesticide. The engine 22 is started. The spray gun 20 is opened, and the air bleed valve 35 is opened to bleed air from the system until the system is primed, then valve 35 is closed. Priming valve 6 in the water phase conduit is then closed and then opened to reduce the water flow momentarily. This raises the oil phase concentration flowing into the mixer, and produces invert emulsion which completes the priming. Then the spray gun 20 is closed. The pressure pop-off valve 30 is set for 250 p.s.i.g. on gauge 15, and the system is set to operate by operation of spray gun 20. The operational procedure will vary with modifications of the apparatus without departing from the spirit of the invention.

In order to maintain the desired water-to-oil ratio, a vacuum of at least 5 inches of mercury as shown by gauge 32 is normally used. If the gauge shows less than 5 p.s.i.g. and pressure gauge 15 reads high, e.g., more than 275 p.s.i.g., the spray nozzle 21 may be too small or obstructed. All connections in the conduits 1 and 8 should be tight to avoid air leaks. If the gauge shows high readings in the neighborhood of 26 inches of mercury or more, the water metering valve 4 or filter screen 2 may be clogged and should be unclogged. It is possible to determine spray volume in gallons per minute from the vacuum gauge readings after suitable calibration.

Pesticide formulations useful in this invention as the oil phase have essentially the composition:

| | Percent |
|---|---|
| Oil | 10–90 |
| Emulsifier | 5–35 |
| Pesticide | 10–60 |

Pesticides which are particularly suitable include such herbicides as 2,4-D acid, 2,4,5-T acid, and amine salts and alkyl or alkoxyalkyl esters of said acids and such insecticides as DDT, Malathion, Toxaphene and the like.

Oils which are useful in the oil phase composition include petroleum distillates, fuel oil, diesel oil, kerosene, and crude aromatic distillates or mixed xylenes.

Emulsifying agents useful in the production of invert emulsions are well known in the art. Preferably long chain fatty amines or salts thereof, or the alkanolamides of long chain fatty acids are used as emulsifiers.

What I claim and desire to protect by Letters Patent is:

1. Apparatus for continuous formation of invert emulsion spray comprising in combination means for commingling an oil phase component and a water phase component to form a thin fluid premix thereof, at least one of which components contains an emulsifier in amount sufficient to form an invert emulsion on agitation, a mixer means, means for conducting said premix to said mixer means, means for placing said premix under elevated pressure such that the premix flows into said mixer means under pressure, said mixer means comprising a vessel containing a mixing chamber having an inlet and an outlet and a rotary mixing element within said chamber having a direction of rotation, such that said rotary mixing element induces a flow toward said inlet at a pressure less than the pressure of said premix at said inlet, a spray nozzle and means for conducting emulsion to said nozzle.

2. Apparatus for producing an invert emulsion from an aqueous phase component and an oil phase component comprising in combination a mixing vessel having a mixing chamber therein, an inlet thereto and an outlet therefrom, a rotary impeller within said chamber, means for rotating said impeller in a direction which induces a flow within said chamber toward said inlet, at least one spray-forming nozzle having an outlet opening to the atmosphere and an inlet, an emulsion conduit joining said mixing vessel outlet to said nozzle inlet, separate feeder conduits for the separate components, a common conduit to which said separate conduits lead connected to said mixing vessel inlet, means for moving said components separately through said feeder conduits and as a commingled premix through said common conduit, means for pumping said premix under elevated pressure to said mixing vessel, said elevated pressure being sufficiently elevated to force said premix through said mixing vessel inlet into said mixing vessel chamber and emulsion outlet of said chamber, through the mixing vessel outlet, through said emulsion conduit, and through said nozzle into the atmosphere as a spray.

3. Apparatus of claim 1 in which said mixer means is a centrifugal pump, wherein the low pressure inlet is used as the mixer outlet, and the high pressure outlet is used as the mixer inlet.

4. Apparatus of claim 1 in which the rotary mixing element is a twisted blade impeller.

References Cited

UNITED STATES PATENTS

| | | | |
|---|---|---|---|
| 2,987,259 | 6/1961 | Lindquist | 239—304 |
| 3,049,302 | 8/1962 | Simmons | 239—304 |
| 3,103,312 | 9/1963 | Damrow | 239—304 |
| 3,197,299 | 7/1965 | Stull et al. | 239—171 |
| 3,245,329 | 4/1966 | Nagin et al. | 239—304 |
| 3,284,009 | 11/1966 | Stull et al. | 239—427 |
| 3,322,350 | 5/1967 | Heinricke et al. | 239—304 |
| 3,441,086 | 4/1969 | Barnes | 239—304 |

EVERETT W. KIRBY, Primary Examiner

U.S. Cl. X.R.

239—171, 304